United States Patent [19]

Meades

[11] Patent Number: 5,041,488

[45] Date of Patent: Aug. 20, 1991

[54] TEMPORARY CAMOUFLAGE PAINT

[75] Inventor: Kenneth G. Meades, Homer, N.Y.

[73] Assignee: Potter Paint Co., Cortland, N.Y.

[21] Appl. No.: 409,409

[22] Filed: Sep. 19, 1989

[51] Int. Cl.$^5$ ................................................ C08J 3/20
[52] U.S. Cl. .................................................... 524/380
[58] Field of Search ........................................ 524/380

[56] References Cited

U.S. PATENT DOCUMENTS

| | | | |
|---|---|---|---|
| 2,833,737 | 5/1958 | Mark et al. | 524/388 |
| 3,063,873 | 11/1962 | Saroyan | 134/4 |
| 3,075,938 | 1/1963 | Johnson | 523/122 |
| 3,095,381 | 6/1963 | Tinnon et al. | 252/550 |
| 4,011,185 | 5/1977 | Hosokawa et al. | 524/380 |
| 4,078,102 | 3/1978 | Bendz et al. | 430/329 |
| 4,200,671 | 4/1980 | Krajewski et al. | 424/154 |
| 4,744,834 | 5/1988 | Haq | 134/38 |

OTHER PUBLICATIONS

Air Products and Chemicals Technical Bulletin, Surfynol 104, (1986).
J. H. Kaspersma, (1982), Paint & Resin 52, 18–20.
U.S. Dept. of the Army, Military Specification MIL-P-52905(ME), Jul. 7, 1976, Paint Arctic Camouflage, Removable.

*Primary Examiner*—Joseph L. Schofer
*Assistant Examiner*—M. Nagumo
*Attorney, Agent, or Firm*—Wall and Roehrig

[57] ABSTRACT

A temporary removable water-based paint produces a protective film which is insensitive to water or weather, but washes off with an ammonia gel. The paint is waterborne employing an acrylic copolymer as a vehicle, and an acetylenic dispersant to disperse the pigment particles in the acrylic copolymer. The acetylenic dispersant is present in an amount of 3-5% by weight of the pigment. The acetylenic dispersant has the property that after it is applied, it becomes water insensitive so it does not rewet on exposure to moisture.

8 Claims, No Drawings

TEMPORARY CAMOUFLAGE PAINT

BACKGROUND OF THE INVENTION

This invention relates to waterborne paints or coatings, and is more particularly directed to an aqueous coating composition of applying as a temporary protective coating which produces a film that when dry is insensitive to water or weather, but can be removed with an ammonia gel or other alkali solution.

There are several applications where temporary, but durable protective paints or coatings would be desirable. For example, if military equipment is to be used temporarily in an arctic or other environment, it may be desirable to camouflage the equipment for that environment, and then remove the camouflage at the end of the operation or exercise. It is also desirable to coat equipment with a durable but removable film if the equipment is to be used in a contaminant environment, so that any contaminants can be taken off with the protective coating.

At present, temporary camouflage paints have not been sufficiently water-insensitive to provide acceptable durability, or else have been extremely difficult to remove when no longer needed.

The nature of many waterborne paints or coatings composition, is that there are tiny particles of a polymer vehicle that are dispersed in water to form a suspension. The polymer itself is colorless, and pigments are added to achieve the desired cover of the visible surface to be coated. These pigments are solid particle colorants and said particle flattening agents. In order to provide effective coating, the particles of pigment must disperse into the vehicle, i.e., must "wet" and surround themselves with the particles of suspended polymer.

For removable coatings, an acrylic copolymer is suitable for use as the vehicle, because although waterborne until applied, it becomes insensitive to water or weather when dried but can be re-sensitized to moisture by application of an alkali solution, such as an ammonia solution or an ammonia gel.

Unfortunately, pigments, i.e., solid particles, do not disperse well in water or the acrylic resin particles, and thus an acrylic based paint or coating requires a surface-active agent to wet the pigments relative to the vehicle. However, after the composition has been applied and dried into a film, conventional surfactants remain water-sensitive and will tend to redissolve or wash away in the presence of moisture.

OBJECT AND SUMMARY OF THE INVENTION

It is an object of this invention to provide a temporary paint or coating composition that overcomes the drawbacks of the prior art.

It is a more specific object of this invention to provide a waterborne composition which dries to a film that is insensitive to water or weather, but which can be removed with an alkali solution such as an ammonia gel.

It is another object to provide a coating that can be removed together with any toxic or corrosive contaminants if the object that is painted with the coating has been exposed to a contaminant-laden environment.

According to an aspect of this invention, the composition is prepared as a waterborne paint in which the vehicle is an aqueous suspension of particles of acrylic copolymer dispersion resin with one or more pigments dispersed in the resin. An acetylenic dispersion surface-active agent, in an amount suitable for dispersing the pigment particles in the suspension, is present in the composition, preferably in an amount equal to about 2 to 3 percent by weight of the solid pigment particles. For this purpose the term "pigments" includes colorants, magnesium silicate or another flattening agent, and/or titanium oxide, zirconium oxide or other opaque white pigment. The composition can also include a small amount of isopropanol or other alcohol as a wetting agent and for freeze protection, and a sufficient amount of ammonia to adjust the pH of the composition into the range of about 7.5 to 8.0.

In a preferred mode, the acetylenic dispersant is a tertiary acetylenic gylcol of the type sold by Air Products and Chemicals, Inc. under the trade name Surfynol 104.

The above and other objects, features and advantages of this invention will be more fully understood from the ensuing description of a preferred embodiment.

DESCRIPTION OF THE PREFERRED EMBODIMENT

For purposes of contrast with this invention, a prior-art temporary coating will be discussed briefly. Military specification MIL-P-52905 (ME) relates to removable arctic camouflage paint for mobility equipment. That specification relates to a quick-drying arctic camouflage paint that can be easily removed when applied on previously painted military or naval equipment. The specification gives a sample formulation for the coating which is based on an aqueous suspension of an acrylic resin. The constituents also include zirconium oxide and/or antimony oxide, natural and synthetic calcium carbonate, methyl isobutyl ketone as a wetting agent, a conventional suspension agent (which is basically a detergent), and sufficient ammonium hydroxide to adjust to a pH of 8.0. The dried film is removed with a gel formed of a 5% ammonium hydroxide solution combined with 2% methyl cellulose.

Unfortunately, all conventional suspension agents retain their water sensitivity after the film has dried. This property has the undesirable result that the paint film will weaken in moisture and will wash away if directly exposed to water.

A first example of a temporary paint according to this invention is formulated as follows:

| Constituent | Weight Percent |
| --- | --- |
| Acrylic Resin Latex | 47.8 |
| 18% Ammonium hydroxide | 2.0 |
| Isopropyl alcohol | 3.5 |
| Surfynol 104A | 1.5 |
| Titanium dioxide, rutile | 15.0 |
| Magnesium silicate | 14.0 |
| Water | 16.2 |
| | 100.0 |

In this case the acrylic resin can be Rohm and Haas Acrysol WS-24 acrylic copolymer dispersion resin, or B.F. Goodrich 514H resin. In this formulation the resin solids form about 15-20% of the total weight. The isopropyl alcohol improves the wetting characteristics and provides a small measure of freeze/thaw stability.

Any pigments which are pH neutral to mildly alkaline may be used as colorants, hiding agents, or flattening agents. These are dispersed into the acrylic dispersion resin by means of an acetylenic or equivalent dispersant. This agent has the property that it will not remain sensitive to moisture after the paint film has dried. This is important to the exterior durability of the coating. Two such dispersants are Surfynol 104 (used here) and Surfynol CT-136, each marketed by Air Products and Chemicals Inc. Surfynol 104 is a tertiary acetylenic glycol, namely (2, 4, 7, 9 - tetramethyl - 5 - decyn - 4, 7 diol), with the formula

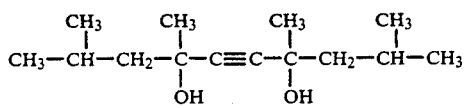

the constituent Surfynol 104A used here is a liquid formed of 50% by weight of this substance in solid form in a carrier, namely 2 - ethylhexanol.

Other suitable agents could be used instead but must have the property of losing their sensitivity to moisture after drying.

Some means of reducing gloss should be used, even if no other pigment is employed. The simplest example of this is finely-divided magnesium silicate or other silicate which should be present in an amount of 7% to 20% by weight of the composition. Specular reflection should be less than 10% at 60° geometry Of course, care should be observed not to overload pigments in order to reduce the film gloss to an acceptable level. Sufficient resin must be present to keep the film from becoming too porous, which would impair its water resistance. Pigment volume concentration should be between 30% and 40%.

Another example of a typical formulation according to this invention is as follows:

| Constituent | Weight Percent |
| --- | --- |
| Water | 17.2 |
| Surfynol 104A | 1.5 |
| Rutile Titanium Dioxide | 15.0 |
| Magnesium Silicate | 14.0 |
| Isopropyl Alcohol | 3.5 |
| Ammonia | 1.0 |
| Acrysol WS-24 | 47.8 |
| | 100.0 |

Surfynol 104 A contains 50% (weight) active solids and Acrysol WS-24 contains 36.0% (weight) solids.

The water and Surfynol 104A are stirred together at moderate speed under a Cowles or similar dissolver. Then the rutile titanium dioxide is added, slowly raising the mixer speed, and the magnesium silicate is added and dispersed to a reading of Hegman 6 or better. The isopropanol is added slowly at reduced mixer speed. The ammonia is added in the same manner. Then the acrylic resin, Acrysol WS-24, is added in a steady stream and is mixed thoroughly.

This paint dries quickly and sample squares painted with it retain their white color and hiding characteristics after exposure outdoors for a period of several months. The film is permanent in nature, and does not weaken nor wash away from exposure to rain, snow, or humidity.

However, when the paint is to be removed from the test square, the film dissolves readily in an ammonia gel.

This coating can be prepared in a clear form for temporary protection from radioactive elements or from biological or chemical toxic agents. The exposed equipment can be readily cleaned by removing the temporary coating and with it the contaminants.

Suitable pigments can be used as camouflage coating for woodland, desert, or other environments with or without infrared or ultraviolet deception capabilities.

While this invention has been described with reference to exemplary preferred embodiments, it should be recognized that the invention is not limited to those precise embodiments. Rather, many modifications and variations would present themselves to those skilled in this art without departure from the same scope and spirit of this invention, as defined in the appended claims.

What is claimed is:

1. A water-based paint or coating composition which produces a protective film that when dry is insensitive to water and weather but which can be rendered soluble by application of an alkali solution, the paint or coating composition comprising an aqueous suspension of an alkali-soluble acrylic copolymer dispersion resin, one or more pigments dispersed in the suspension, a tertiary acetylenic glycol dispersant in suitable amount equal to about 2-3% by weight of the pigments to serve as a primary dispersant for dispersing said pigments in said suspension, and aqueous ammonia in sufficient quantity to adjust the pH of the composition to be at least slightly basic, said tertiary acetylenic glycol dispersant having the property that it is water soluble until the composition is applied but becomes insensitive to moisture after the protective film has dried.

2. The paint or coating composition of claim 1 wherein said pigment includes a suitable amount of a flattening agent.

3. The paint or coating composition of claim 2 wherein said flattening agent includes a silicate.

4. The paint or coating composition of claim 3 wherein said tertiary acetylenic glycol is in the form:

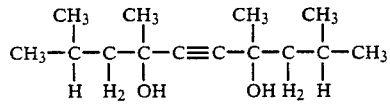

5. The paint or coating composition of claim 1 further comprising an alcohol in the amount of about 3-5 weight percent of the composition.

6. The paint or coating composition of claim 1 further comprising aqueous ammonia in sufficient quantity to adjust the pH of the composition to within a range of 7.5 to 8.0.

7. The paint or coating composition of claim 1 wherein said pigments are present in an amount equal to between 30% and 40% by volume of total solids in which said total solids includes the pigments, the dispersed acrylic copolymer resin, and the acetylenic dispersant.

8. The paint or coating composition of claim 1 wherein said pigments include a finely divided silicate added as a means of reducing gloss.

* * * * *